(12) United States Patent
Desai et al.

(10) Patent No.: US 11,327,927 B2
(45) Date of Patent: May 10, 2022

(54) SYSTEM AND METHOD FOR CREATING GROUP SNAPSHOTS

(71) Applicant: VMware, Inc., Palo Alto, CA (US)

(72) Inventors: Asit Desai, Cupertino, CA (US); Derek Uluski, Weymouth, MA (US); Alexander T. Garthwaite, South Hamilton, MA (US); Sunil Satnur, Cupertino, CA (US); Ilya Languev, Palo Alto, CA (US); Raveesh Ahuja, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 311 days.

(21) Appl. No.: 16/112,700

(22) Filed: Aug. 25, 2018

(65) Prior Publication Data

US 2020/0065399 A1    Feb. 27, 2020

(51) Int. Cl.
*G06F 16/00* (2019.01)
*G06F 16/11* (2019.01)
*G06F 9/455* (2018.01)
*G06F 16/22* (2019.01)

(52) U.S. Cl.
CPC ........ *G06F 16/128* (2019.01); *G06F 9/45558* (2013.01); *G06F 16/2246* (2019.01); *G06F 2009/45562* (2013.01)

(58) Field of Classification Search
CPC ............... G06F 16/128; G06F 16/2246; G06F 16/45558; G06F 9/45558

USPC ........................................................ 707/649
See application file for complete search history.

(56) References Cited

U.S. PATENT DOCUMENTS

| | | | | |
|---|---|---|---|---|
| 2014/0258238 | A1* | 9/2014 | Jin | G06F 9/45558 707/649 |
| 2015/0178362 | A1* | 6/2015 | Wheeler | G06F 16/27 707/639 |
| 2017/0031769 | A1* | 2/2017 | Zheng | G06F 11/1471 |
| 2017/0052717 | A1* | 2/2017 | Rawat | G06F 3/067 |
| 2017/0315728 | A1* | 11/2017 | Zheng | G06F 3/0604 |
| 2018/0267985 | A1* | 9/2018 | Badey | G06F 16/128 |

* cited by examiner

*Primary Examiner* — Vincent F Boccio
(74) *Attorney, Agent, or Firm* — Loza & Loza, LLP

(57) ABSTRACT

System and method for creating group snapshots of multiple storage objects uses storage structures to store the storage objects in a storage system. In order to create a group snapshot of storage objects, a prepare snapshot process is executed at each of multiple host computers managing the storage objects as storage structures to block input and output operations on the storage objects stored in the storage structures. A commit snapshot process is then executed at each of the multiple host computers to create snapshots of the storage object in the respective storage structures. In addition, the snapshots of the storage object are recorded in the respective storage structures as snapshot entries in the respective storage structures.

20 Claims, 12 Drawing Sheets

SYSTEM AND METHOD FOR CREATING GROUP SNAPSHOTS

BACKGROUND

Snapshot technology is commonly used to preserve point-in-time (PIT) state and data of a virtual computing instance (VCI), such as a virtual machine. Snapshots of virtual computing instances are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involve creating a chain or series of snapshots to maintain changes to the underlying data using a B tree structure, such as a B+ tree structure. A significant advantage of the tree-based snapshot techniques over the redo-log based snapshot techniques is the scalability of the tree-based snapshot techniques. However, the snapshot structure of the tree-based snapshot techniques is intertwined and complex, especially when snapshot sizes and snapshot numbers are large. Thus, an important aspect of a snapshot system using a tree-based snapshot technique is managing the snapshots of storage objects for various applications, including applications that are supported by multiple storage objects.

BRIEF DESCRIPTION OF THE DRAWINGS

Throughout the description, similar reference numbers may be used to identify similar elements.

DETAILED DESCRIPTION

Figure 1:
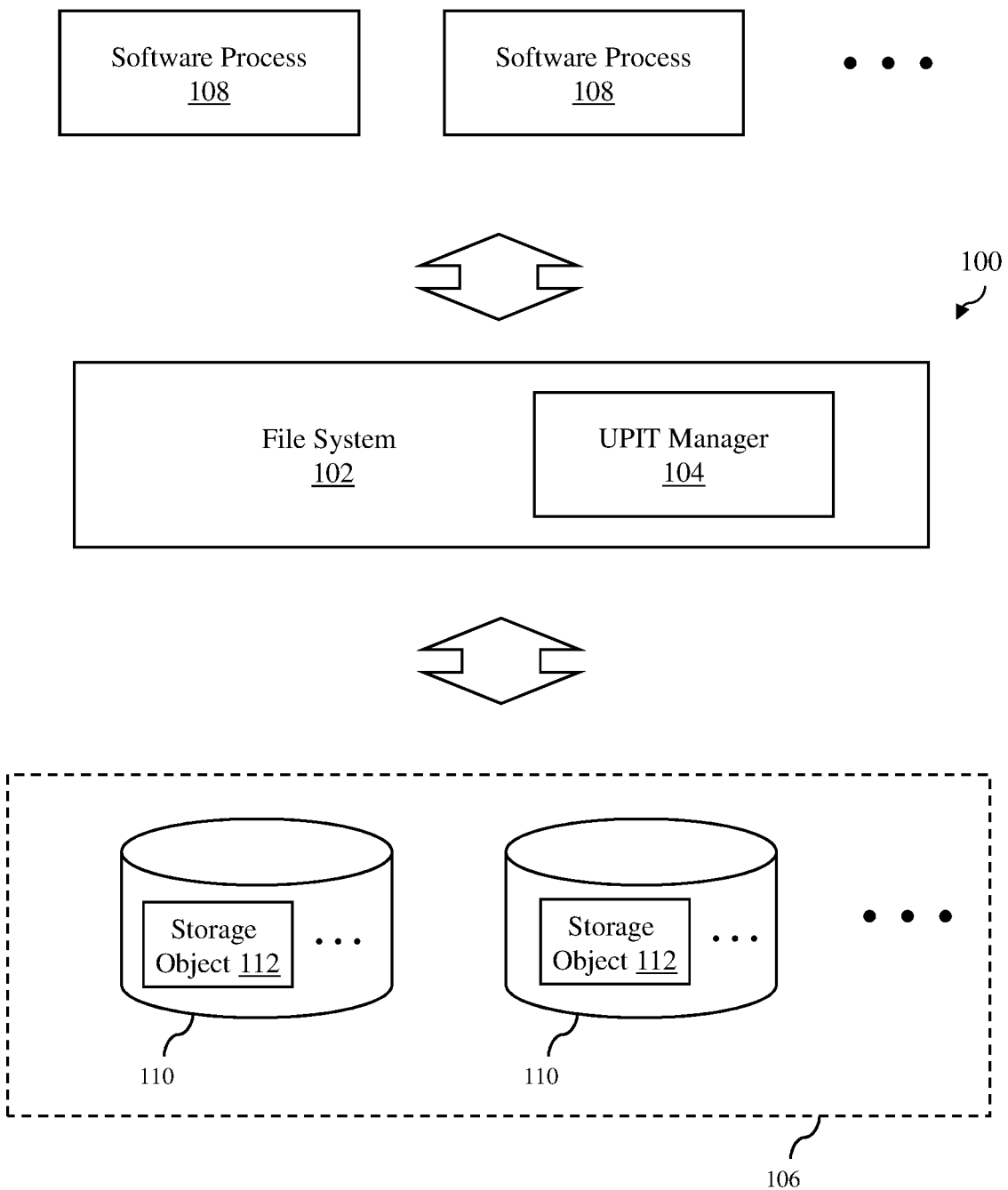
FIG. 1 is a block diagram of a computer system in accordance with an embodiment of the invention.

FIG. 1 depicts a computer system 100 in accordance with an embodiment of the invention. The computer system 100 is shown to include a file system 102 with a universal point-in-time (UPIT) manager 104 and a storage system 106. Other components of the computer system 100 that are commonly found in conventional computer systems, such as memory and processors, are not shown in FIG. 1. The computer system 100 allows software processes 108 to perform file system operations, such as creating/reading/writing/deleting data in the storage system 106, e.g., directories, folders, files and other storage objects, and to perform snapshot operations, such as creating/deleting snapshots of the data in the storage system 106. As described in detail below, the computer system 100 operates to manage snapshots of storage objects to ensure consistency and prevent data corruptions. In addition, the computer system 100 allows copying or cloning storage objects using snapshots of the storage objects to create new replicated storage objects.

The software processes 108 can be any software program, applications or software routines that can run on one or more computers, which can be physical computers, virtual computers, such as VMware virtual machines, or distributed computer systems. The software processes 108 may initiate various data storage operations, such as read, write, delete and rename operations, for data stored in the storage system 106, which are then executed by the computer system 100. In addition, the software processes 108 may also initiate various snapshot operations, such as creating and deleting snapshots for data stored in the storage system 106.

The storage system 106 includes one or more computer data storage devices 110, which are used by the computer system 100 to store data, including metadata of storage objects 112 and actual data of the storage objects 112. In some embodiments, a single storage object may be distributed among multiple storage devices. The data storage devices can be any type of non-volatile storage devices that are commonly used for data storage. As an example, the data storage devices may be, but not limited to, solid-state devices (SSDs), hard disks or a combination of the two.

In an embodiment, the storage system 106 may be a local storage system of the computer system 100, such as hard drive disks in a physical server-grade computer. In another embodiment, the storage system 106 may be a distributed storage system such as a storage area network (SAN). In still another embodiment, the storage system 106 may be a collection of local storage systems of physical computers (not shown) in the computer system 100, such as hard drive disks in a personal computer system, which forms a virtual SAN. In still another embodiment, the storage system 106 may be a remote storage system that can be accessed via a network, such as a network-attached storage (NAS). Depending on the embodiment, the storage system 106 may include other components commonly found in those types of storage systems, such as network adapters, storage drivers and/or storage management servers. The storage system 106 may be scalable, and thus, the number of data storage devices 110 included in the storage system can be changed as needed to increase or decrease the capacity of the storage system to support increase/decrease in workload. Consequently, the exact number of data storage devices 110 included in the storage system 106 can vary from one to hundreds or more.

The storage system 106 may be used to store data in any logical storage units, such as file systems, files, groups of files, datastores, logical unit number (LUN) objects and virtual volumes (VVOLs). In addition, the storage system 106 may be used to store snapshots of any of these logical storage units or snapshots of applications using the data storage, such as virtual computing instances. As used herein, the term "virtual computing instance" is any software entity that can run on a computer system, such as a software application, a software process, a virtual machine and a "container" that provides system-level process isolation, such as a Docker container. Snapshots of virtual computing instances can be viewed as "images" of the virtual computer instances at the time when the snapshots were taken or created. As an example, a snapshot of a virtual machine is a copy of the non-volatile memory or virtual disk of the virtual machine, as well as the volatile memory of the virtual machine, at the time the snapshot was taken. A virtual machine snapshot may also include the configuration or settings of the virtual machine and the BIOS configuration at the time the snapshot was taken.

The file system 102 operates to manage file system operations to and from the software processes 108 and the storage system 106 for storage objects, such as file system volumes, file directories/folders, and files, for shared use of the storage system 106. Thus, the file system 102 organizes the storage resources of the storage system 106 into the file system structures so that the software processes 108 can access the storage objects for various storage operations, such as creating file system objects, deleting file system objects, writing or storing file system objects, reading or retrieving file system objects and renaming file system objects.

The UPIT manager 104 of the file system 102 operates to manage snapshots of storage objects stored in the storage system 106. The UPIT manager 104 manages the creation and deletion of snapshots of storage objects stored in the storage system. The UPIT manager 104 also supports various bookkeeping operations with respect to the snapshots, such as generating identifiers for the snapshots. As explained in more detail below, at least some storage objects and their snapshots are maintained in storage structures referred to herein as UPIT structures, which are stored in the storage system 106, such that each storage object and its snapshots are contained in a single storage structure. The UPIT manager 104 interacts with the UPIT structures to ensure snapshots are created and deleted in these UPIT structures. The UPIT manager 104 also manages linked clones that are created from snapshots of storage objects in UPIT structures, as described in more detail below.

Figure 2A:
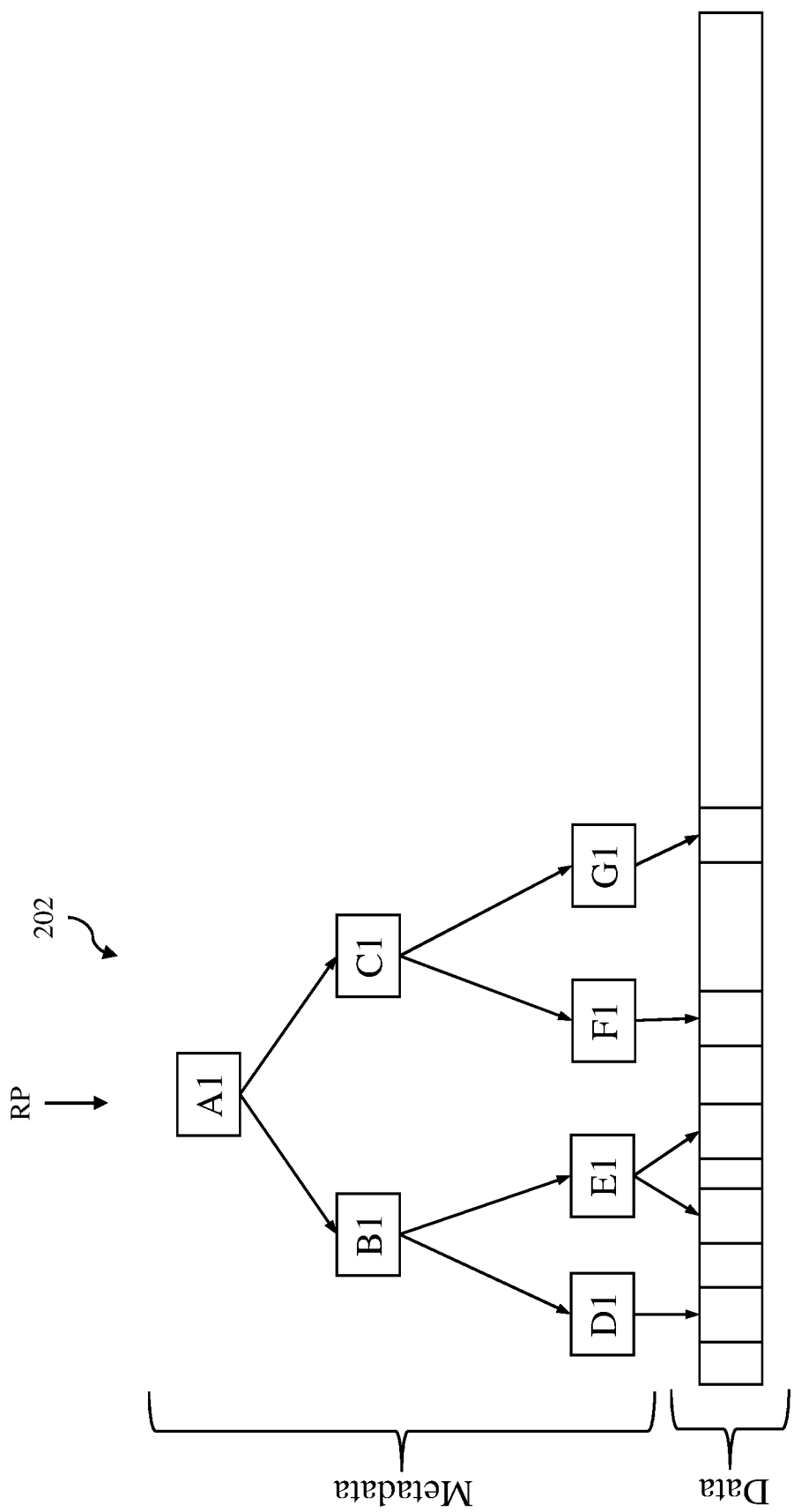
FIGS. 2A-2C illustrate a copy-on-write (COW) B+ tree structure for one storage object managed by a universal point-in-time (UPIT) manager of the computer system in accordance with an embodiment of the invention.
Figure 2B:
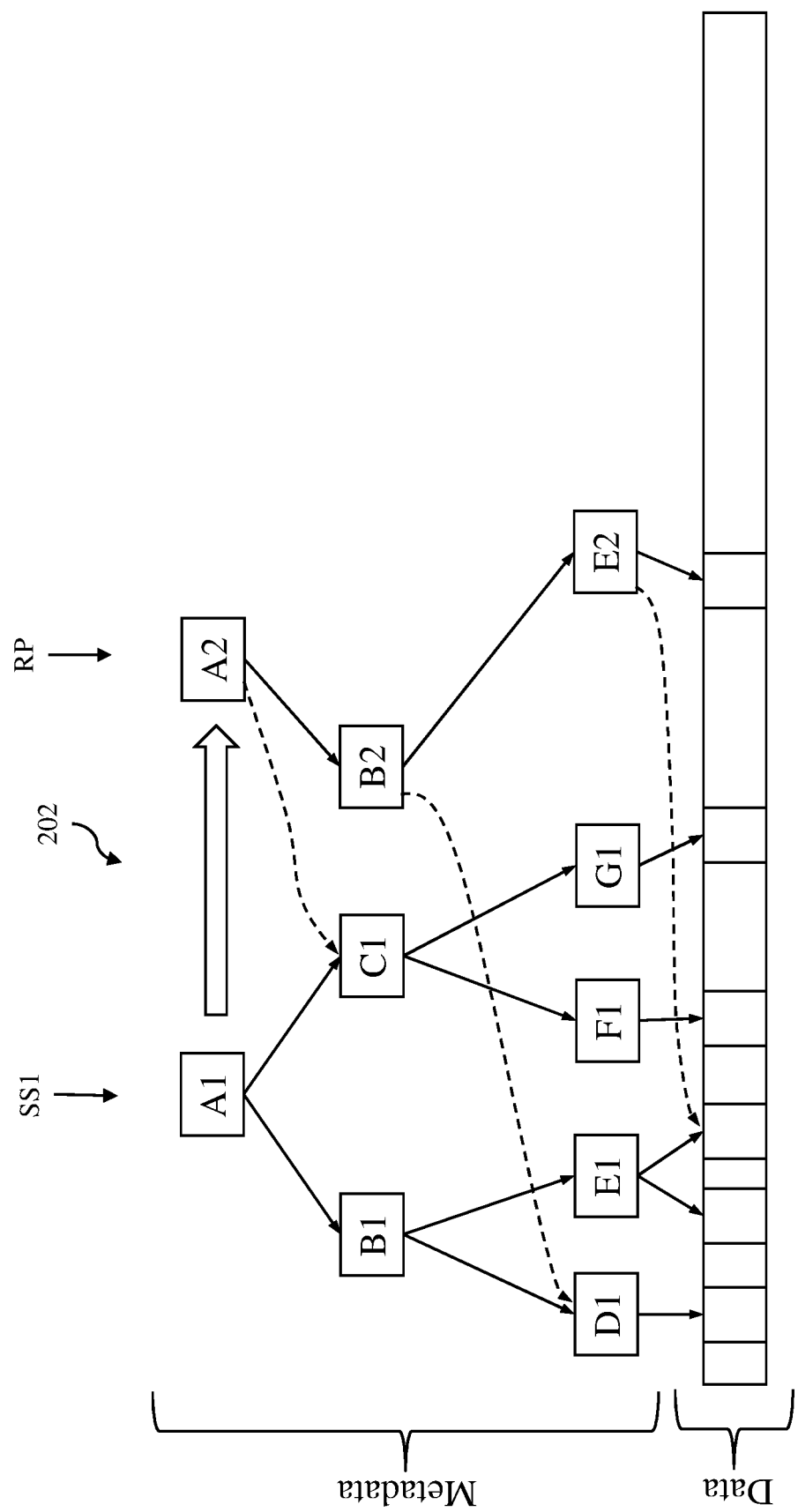
Figure 2C:
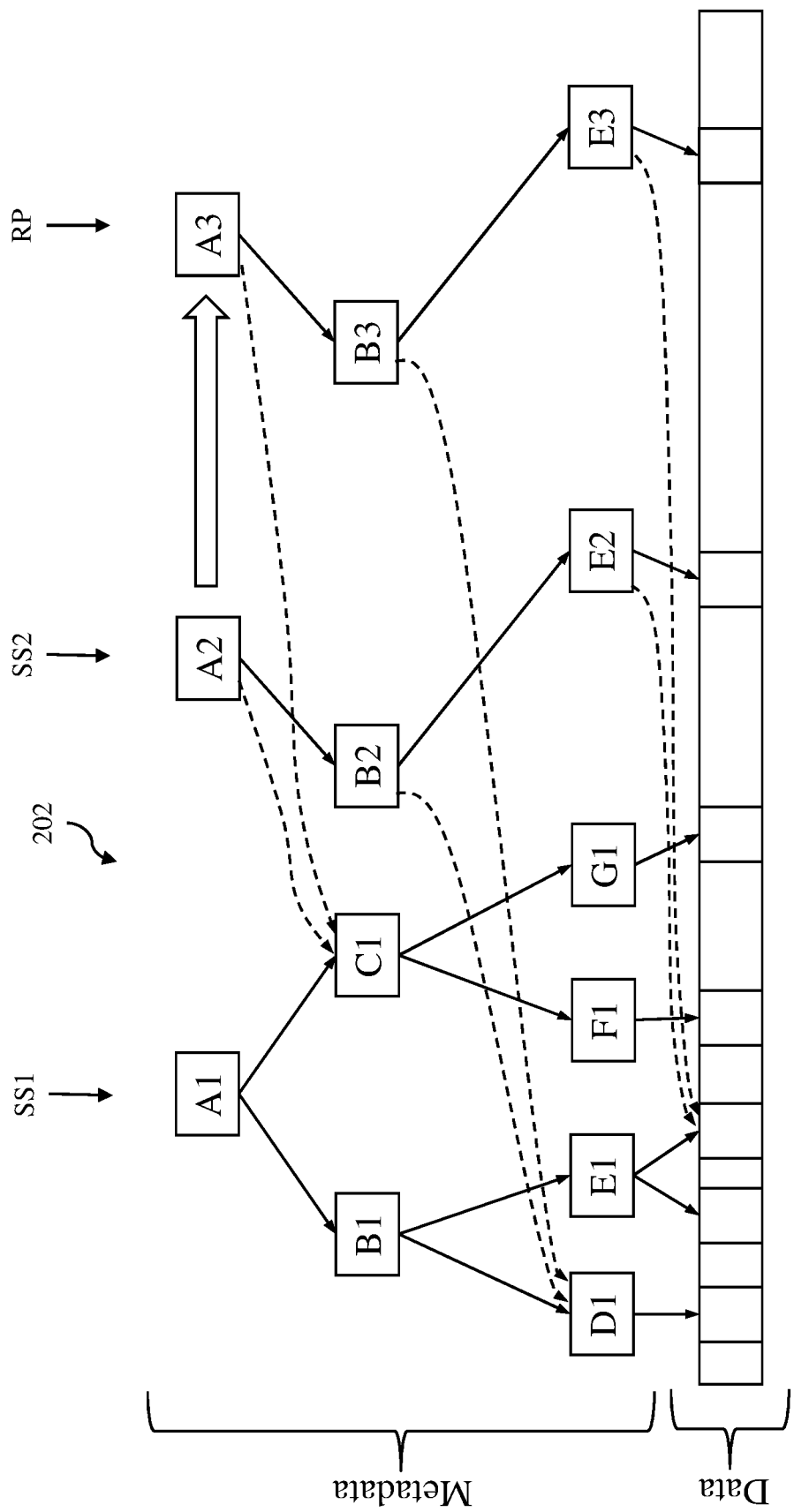

The UPIT manager 104 leverages B tree structures, such as copy-on-write (COW) B+ tree structures, to organize storage objects and their snapshots taken at different times. A COW B+ tree structure for one storage object managed by the UPIT manager 104 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the storage system 106.

FIG. 2A shows the storage object before any snapshots of the storage object were taken. The storage object comprises data, which is stored in data blocks in the storage system 106, as defined by a B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other index nodes. Each leaf node records the mapping from logic block address (LBA) to the physical location or address in the storage system. Each node in the B+ tree structure may include a node header and a number of references or entries. The node header may include information regarding that particular node, such as an identification (ID) of the node. Each entry in the leaf nodes may include an LBA, the entry type (e.g., private or shared), physical extent location, checksum and other characteristics of the data for this entry. In FIG. 2A, the nodes A1-G1 are modifiable. Thus, the tree with the nodes A1-G1 can be viewed as the current state or running point (RP) of the storage object.

FIG. 2B shows the storage object after a first snapshot SS1 of the storage object was taken. Once the first snapshot SS1 is created or taken, all the nodes in the B+ tree structure become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In an embodiment, the first snapshot of a storage object may include a snapshot generation identification, such as a number, and data regarding all the nodes in the B+ tree structure, e.g., the nodes A1-G1 in the example shown in FIG. 2B. When a modification of the storage object is made, after the first snapshot is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot include a snapshot generation identification, such as a number, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3A:
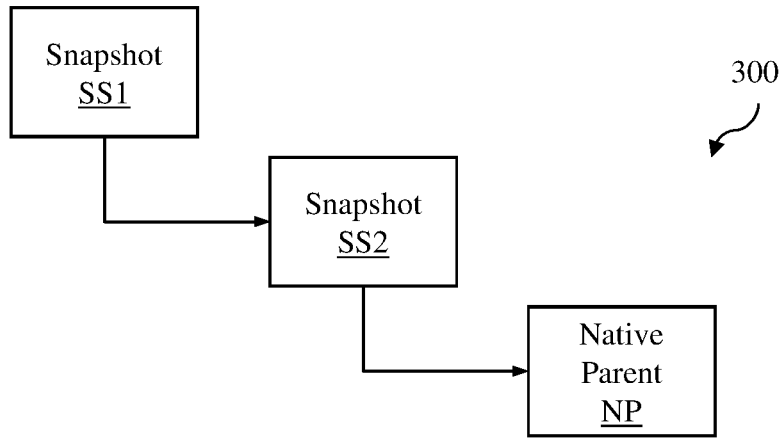
FIGS. 3A and 3B illustrate snapshot hierarchy and relationship in accordance with an embodiment of the invention.

In this manner, multiple snapshots of a storage object can be created at different times. These multiple snapshots create a hierarchy of snapshots. FIG. 3A illustrates a hierarchy 300 of snapshots for the example described above with respect to FIGS. 2A-2C. As shown in FIG. 3A, the hierarchy 300 includes a first snapshot SS1, a second snapshot SS2 and a native parent NP. The native parent NP is the current state of the storage object, which is the same as the running point for the storage object. Thus, the snapshot hierarchy 300 illustrates how snapshots of a storage object can be visualized.

Figure 3B:
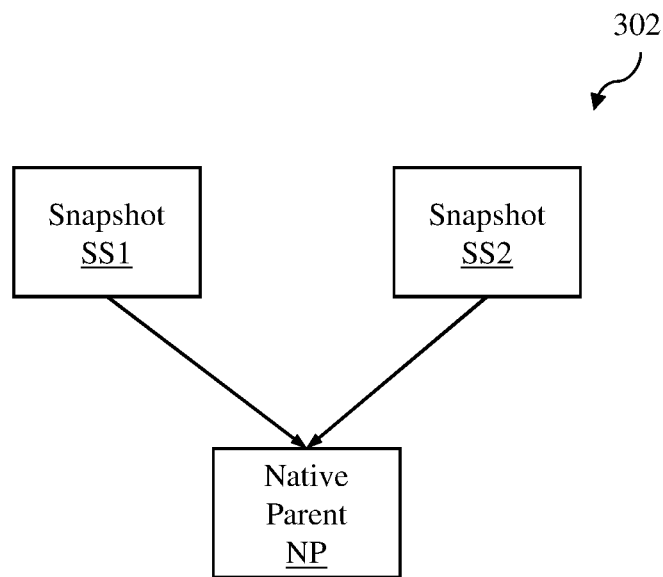

Each snapshot of a storage object can be viewed as a child of a native parent since each snapshot is a point-in-time representation of the native parent and is derived from the native parent. In an embodiment, all the snapshots of a storage object can be referenced by the storage object. Thus, the storage object can maintain a record of the snapshots of the storage object. This relationship 302 is illustrated in FIG. 3B, which shows that the first and second snapshots SS1 and SS2 are referenced by the native parent NP.

Unlike conventional snapshots of storage objects, which are maintained as separate storage objects, the file system 102 and the UPIT manager 104 use a single storage structure to store the native parent and all referenced snapshots for each storage object. Thus, all the information regarding all the snapshots of a storage object is contained in the single structure, which will be referred to herein as universal point-in-time (UPIT) structure. In an embodiment, the UPIT structure includes a directory of snapshots contained in the UPIT structure, and associated with each of these individual points in time or snapshots is a reference count that indicates inter alia the number of linked clones created off of that snapshot.

Figure 4:
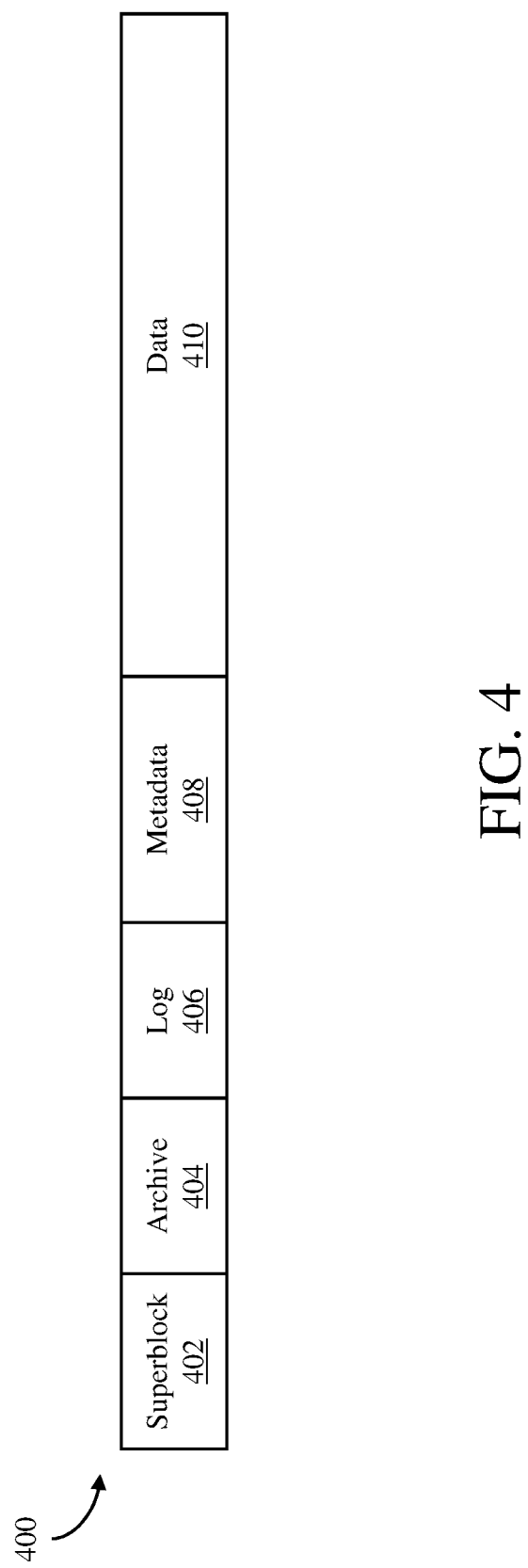
FIG. 4 is a block diagram of a UPIT structure in accordance with an embodiment of the invention.

Turning now to FIG. 4, a UPIT structure 400 for a storage object in accordance with an embodiment of the invention is shown. The UPIT structure 400 includes a superblock section 402, an archive section 404, a log section 406, a metadata section 408 and a data section 410. The superblock section includes information regarding checkpointing information. The archive section includes information regarding historical and current snapshots of the storage object, such as creation and deletion of snapshots at different points in time. The archive section also includes information regarding linked clones that have been created from the snapshots in the UPIT structure 400. The log section includes logs of input and output (I/O) operations for the UPIT structure 400 (e.g., insert and delete data operations). The metadata section includes information regarding the nodes of the B+ tree structure being used to store the data of the storage object. Thus, the metadata section includes all the nodes of the snapshots and the native parent of the storage object, some of which are shared by the snapshots and the native parent. The data section includes the data being stored in the UPIT structure. Thus, the data section includes data for the snapshots and the native parent of the storage object. In this embodiment, the UPIT structure is composed of a single file. However, in other embodiments, the UPIT structure may be composed of multiple files, where the first file of the UPIT structure will be similar to the UPIT structure 400 shown in FIG. 4, but other files of the UPIT structure may only include a metadata section and a data section.

Figure 5:
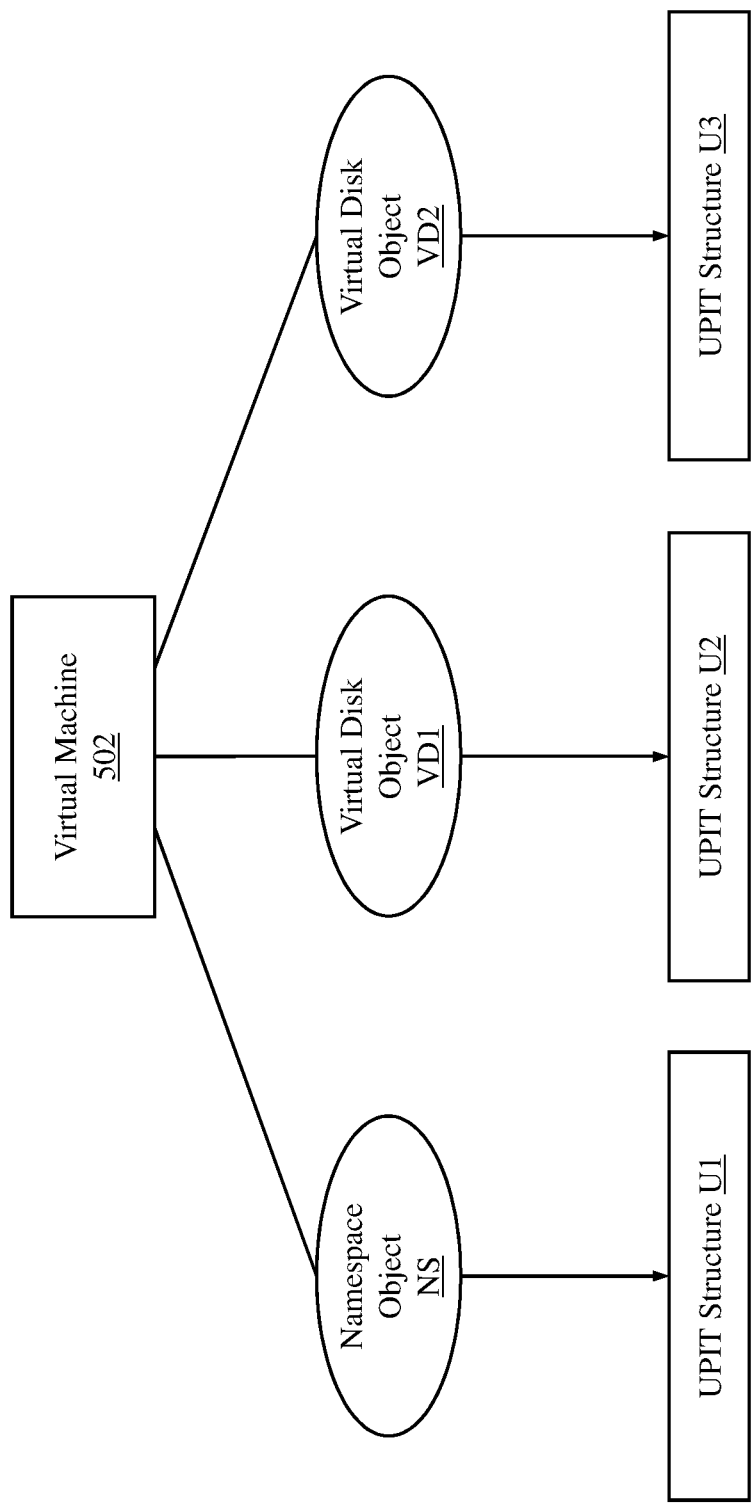
FIG. 5 is an example of a virtual machine supported by a namespace object NS and two virtual disk objects that are stored in UPIT structures in accordance with an embodiment of the invention.

In some applications, multiple storage objects may support those applications. Thus, for these applications, multiple UPIT structures must be collectively managed. For these applications, in order to snapshot an application, i.e., capture the state of the application at a particular moment in time, all the supporting storage objects must be captured together at the same time in a crash consistent manner. As an example, as illustrated in FIG. 5, a virtual machine 502 may be supported by a namespace object NS (where descriptor files for the virtual machine are stored) and one or more virtual disk objects (where a virtual disk of the virtual machine is stored). In this example, the virtual machine 502 has two virtual disk objects VD1 and VD2. The namespace object is stored in a UPIT structure U1. The virtual disk objects VD1 and VD2 are stored in UPIT structures U2 and U3, respectively. If a snapshot of the virtual machine 502 is desired, snapshots would need to be created for the namespace object NS and the two virtual disk objects VD1 and VD2 in the respective UPIT structures at relatively the same time such that the write order guarantee is maintained in case of a system crash or other failure. Such a snapshot is referred to herein as a group snapshot. For some scenarios, there may be a need to snapshot multiple applications supported by multiple storage objects, e.g., a set of virtual machines. In such scenarios, snapshots need to be created for all the storage objects supporting the different applications. In the case of a set of virtual machines, snapshots would need to be created for all the namespace objects and virtual disk objects of the virtual machines at relatively the same time.

The file system 102 can be used to create group snapshots of multiple storage objects stored in different UPIT structures, e.g., storage objects of a single virtual machine. In order to ensure crash consistency, the file system 102 may provide the functionality to atomically snapshot a group of storage objects. As described in more detail below, the file system 102 can preserve the write ordering in case the storage object in the group are collectively supporting an application. The file system follows two-phase commit protocol, where "prepare snapshot" process is first performed for all the storage object in the group and then "snapshot" process is performed for all the storage objects in the group. During the "prepare snapshot" phase, new input and output (I/O) operations are blocked on each storage object and then the file system waits for ongoing I/O operations to complete. Once I/O operations are blocked on a storage object, a timer is started, and a snapshot request should be received before the timer expires. Then, during the "snapshot" phase, after a snapshot has been created for a storage object, I/O operations are unblocked for that storage object. If a snapshot request is not received before the timer expires, the group snapshot operation is failed. The group snapshot operation is atomic so if there is a failure while taking one of the snapshots, the snapshots of any storage objects in the group that have been taken as part of the group snapshot operation are deleted. Also, if there is a failure during or after the "prepare snapshot" phase, the file system will cancel the group snapshot operation and unblock I/O operations on the storage objects of the group.

In some embodiments, the file system 102 may be part of a distributed storage network, such as a virtual storage array network (VSAN), where storage objects may be distributed among multiple physical storage devices in a storage system, which may be local storage devices attached to physical host computers. In such storage network, the storage objects of a group may be managed by different physical host computers. A distributed computer system with such a virtual storage array network is illustrated in FIG. 6.

Figure 6:
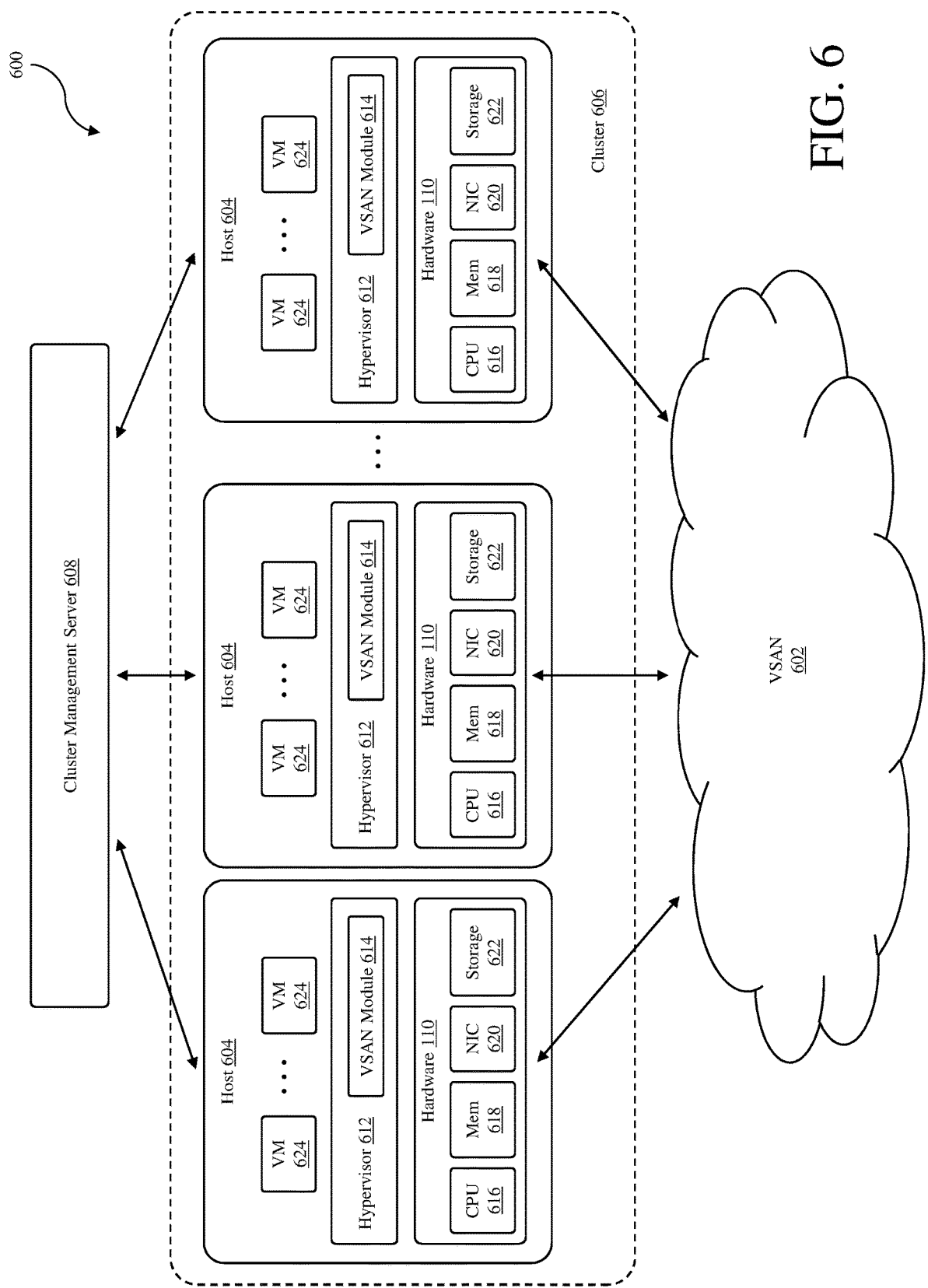
FIG. 6 is a block diagram of a distributed computer system with a virtual storage array network is illustrated in FIG. 6 in accordance with an embodiment of the invention.

FIG. 6 illustrates a distributed storage system 600 in accordance with an embodiment of the invention. As shown in FIG. 6, the distributed storage system 600 provides a software-based "virtual storage area network" (VSAN) 602 that leverages local storage resources of host computers 604, which are part of a logically defined cluster 606 of host computers that is managed by a cluster management server 608. The VSAN 602 allows local storage resources of the host computers 604 to be aggregated to form a shared pool of storage resources, which allows the host computers, including any software entities running on the host computers, to use the shared storage resources.

The cluster management server 608 operates to manage and monitor the cluster 606 of host computers. The cluster management server may be configured to allow an administrator to create the cluster 606, add host computers to the cluster and delete host computers from the cluster. The cluster management server may also be configured to allow an administrator to change settings or parameters of the host computers in the cluster regarding the VSAN 602, which is formed using the local storage resources of the host computers in the cluster. The cluster management server may further be configured to monitor the current configurations of the host computers and any virtual computing instances running on the host computers, for example, virtual machines (VMs) 624. The monitored configurations may include hardware configuration of each of the host computers and software configurations of each of the host computers. The monitored configurations may also include virtual computing instance hosting information, i.e., which virtual computing instances (e.g., VMs) are hosted or running on which host computers. The monitored configurations may also include information regarding the virtual computing instances running on the different host computers in the cluster.

The cluster management server 608 may also perform operations to manage the virtual computing instances 624 and the host computers 604 in the cluster 606. As an example, the cluster management server may be configured to perform various resource management operations for the cluster, including virtual computing instance placement operations for either initial placement of virtual computing instances and/or load balancing. The process for initial placement of virtual computing instances, such as VMs, may involve selecting suitable host computers for placement of the virtual computing instances based on, for example, memory and CPU requirements of the virtual computing instances, the current memory and CPU load on all the host computers in the cluster and the memory and CPU capacity of all the host computers in the cluster.

In some embodiments, the cluster management server 608 may be a physical computer. In other embodiments, the cluster management server may be implemented as one or more software programs running on one or more physical computers, such as the host computers 604 in the cluster 606, or running on one or more virtual machines, which may be hosted on any host computers. In an implementation, the cluster management server is a VMware vCenter™ server with at least some of the features available for such a server.

As illustrated in FIG. 6, each host computer 604 in the cluster 606 includes hardware 610, a hypervisor 612, and a VSAN module 614. The hardware 610 of each host computer includes hardware components commonly found in a physical computer system, such as one or more processors 616, one or more system memories 618, one or more network interfaces 620 and one or more local storage devices 622 (collectively referred to herein as "local storage"). Each processor 616 can be any type of a processor, such as a central processing unit (CPU) commonly found in a server. In some embodiments, each processor may be a multi-core processor, and thus, includes multiple independent processing units or cores. Each system memory 618, which may be random access memory (RAM), is the volatile memory of the host computer 604. The network interface 620 is an interface that allows the host computer to communicate with a network, such as the Internet. As an example, the network interface may be a network adapter. Each local storage device 622 is a nonvolatile storage, which may be, for example, a solid-state drive (SSD) or a magnetic disk. The local storage device 622 is used as a shared storage resource for the VSAN 602.

The hypervisor 612 of each host computer 604, which is a software interface layer that, using virtualization technology, enables sharing of the hardware resources of the host computer by virtual instances 624, such as VMs, running on the host computer. With the support of the hypervisor, the VMs provide isolated execution spaces for guest software.

The VSAN module 614 of each host computer 604 is part of the VSAN 602. Each VSAN module 614 performs the functions of the UPIT manager 104, and thus, can manage one or more storage objects as UPIT structures stored in the local storage resources of the host computer. These VSAN modules, which are distributed on the different host computers 604, form a file system for the VSAN, and thus, can perform functions of the file system 102 on a larger, distributed environment. The VSAN module of each host computer 604 provides access to the local storage resources of that host computer (e.g., handle storage input/output (I/O) operations to storage objects stored in the local storage resources as part of the VSAN 602) by other host computers 604 in the cluster 606 or any software entities, such as VMs, running on the host computers in the cluster. As an example, the VSAN module of each host computer allows any VM running on any of the host computers in the cluster to access data stored in the local storage resources of that host computer, which may include virtual disk (or portions thereof) of VMs running on any of the host computers and other related files of those VMs. The VSAN module of each host computer is able to store at least some of the storage objects as UPIT structures on the local storage resources of that host computer. As described in detail below, the VSAN modules 614 on the different host computers 604 can operate to, response to a group snapshot request from any software process, such as a data protection software or from a virtualization software, to atomically take group snapshots of storage objects in a group, which are stored as UPIT structures on local storage resources of the host computers. The group snapshot operation performed by the VSAN modules will be described using an example illustrated in FIG. 7.

Figure 7:
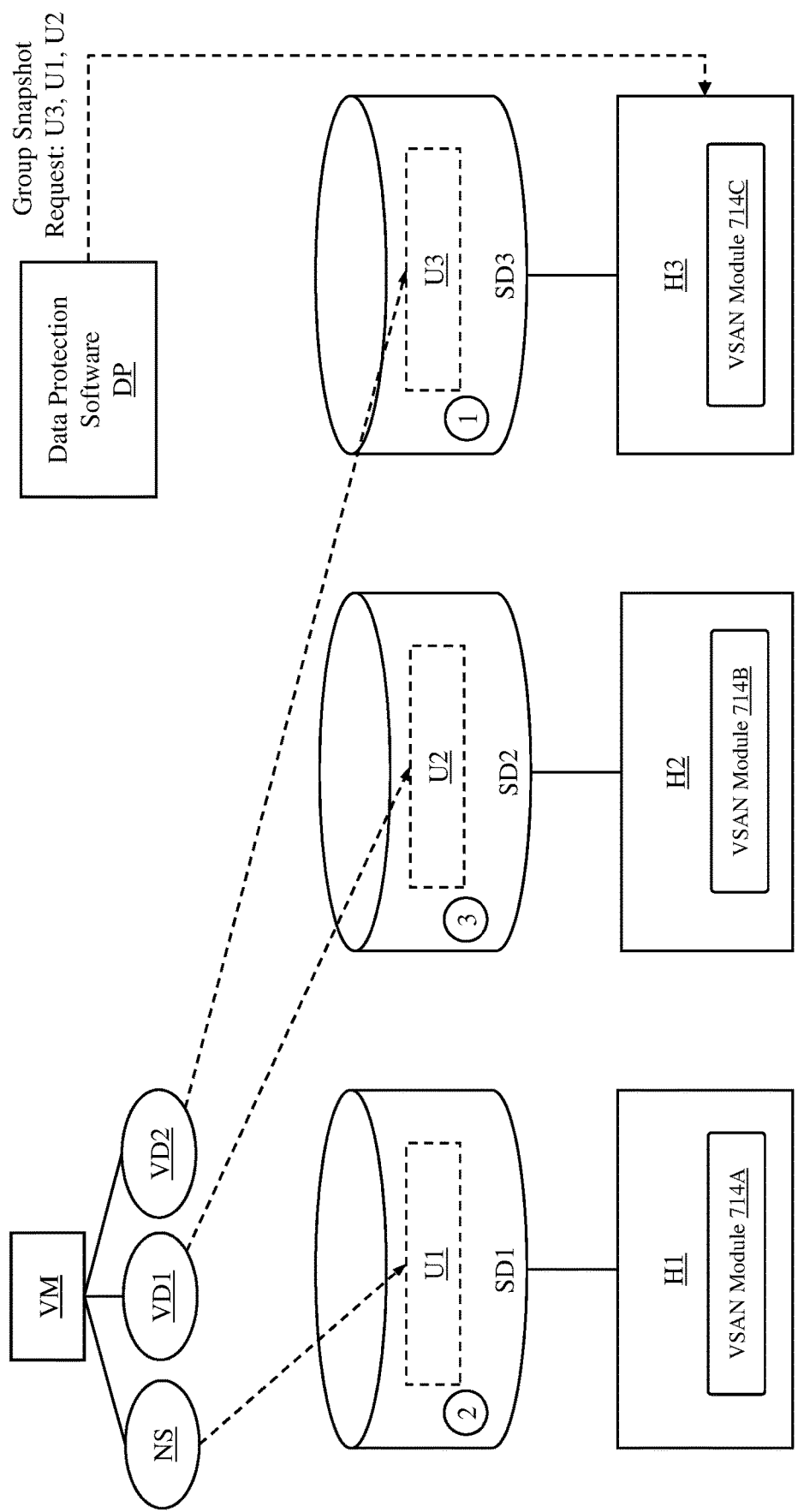
FIG. 7 is an example showing three host computers with local storage devices that are managing a namespace object and virtual disk objects of a virtual machine in accordance with an embodiment of the invention.

In the example of FIG. 7, three host computers H1, H2 and H3 with local storage devices SD1, SD2 and SD, respectively, are shown. These host computers are similar or identical to the host computers 604 in the cluster 606. The host computers H1, H2 and H3 are illustrated in FIG. 7 with their VSAN modules 714A, 714B and 714C, respectively, while other components of these host computers are not shown. The local storage devices of the three host computers are part of a VSAN. A virtual machine VM is running on the host computer H1. The virtual machine has a namespace object NS and virtual disk objects VD1 and VD2, which are stored in the VSAN. In particular, the namespace object NS is stored on the local storage device SD1 as UPIT structure U1, while the virtual disk objects VD1 and VD2 are stored on the local storage devices SD2 and SD3 as UPIT structures U2 and U3, respectively. Thus, the namespace object NS is managed by the host computer H1, while the virtual disk objects VD1 and VD2 are managed by the host computers H2 and H3, respectively. Also shown in FIG. 7 is a data protection software DP, which may be running on any computer, including any of the host computers H1, H2 and H3. The data protection software is enabled to protect the virtual machine VM from failures by periodically taking a snapshot of the virtual machine so that the snapshots can be used to recover the virtual machine when there is a failure.

Specifically, the snapshots of the virtual machine VM include group snapshots of the namespace object NS and the virtual disk objects VD1 and VD2, which support the virtual machine.

The group snapshot operation executed by a VSAN file system that includes the VSAN modules 614 in the different host computers 604 of the distributed computer system 600 in accordance with an embodiment of the invention will now be described with reference to the example shown in FIG. 7 and the flow diagram of FIGS. 8A and 8B. At block 802, a request to create a group snapshot of multiple storage objects, e.g., storage objects of a virtual machine, is received at one of the VSAN modules of the VSAN file system. In an embodiment, the request may include identifications of the UPIT structures of the storage objects for the group snapshot in a predefined order. The request for a group snapshot can be from the data protection program or any other software process, such as a virtualization software in response to user input. It is noted here that it does not matter which VSAN module receives the group snapshot request. In fact, the group snapshot request may be received by the VSAN module of a host computer that is not managing any of the storage objects identified in the group snapshot request. The VSAN module that receives the group request will sometimes be referred to herein as the driving VSAN module because that VSAN module will be driving the processes of the group snapshot operation. In the example of FIG. 7, a group snapshot request is made by the data protection software DP and received by the VSAN module 714C of the host computer H3. Thus, in this example, the VSAN module 714C of the host computer H3 is the driving VSAN module for the group snapshot. The group snapshot request includes identifications of the UPIT structures U1, U2 and U3 in the following order: U3, U1, U2.

Next, at block 804, a lookup process is performed by the driving VSAN module to identify all the host computers managing the different storage objects identified in the group snapshot request. In an embodiment, a database of host computers and storage objects that are being managed by the host computers as UPIT structures is maintained on a storage system, which is accessible by all the host computers supporting the VSAN. Thus, in this embodiment, the lookup process performed by the driving VSAN module involves accessing the database to identify the host computers managing the UPIT structures of the different storage objects identified in the group snapshot request. In an embodiment, the UPIT structures of the different storage objects identified in the group snapshot request may be stored in a single datastore, which is a logical storage unit defined in the VSAN. In the example of FIG. 7, the host computer H1 would be identified as managing the UPIT structure U1 of the namespace object NS, the host computer H2 would be identified as managing the UPIT structure U2 of the virtual disk object VD1, and the host computer H3 would be identified as managing the UPIT structure U3 of the virtual disk object VD2.

Next, at block 806, a prepare metadata message is transmitted from the driving VSAN module to the VSAN modules of the host computers managing the different storage objects identified in the group snapshot request. The prepare metadata message includes at least the identification of the group snapshot being created. In the example of FIG. 7, a prepare metadata message would be sent from the driving VSAN module 714C of the host computer H3 to the host computer H3 (itself), the VSAN module 714A of the host computer H1 and the VSAN module 714B of the host computer H2.

Next, at block 808, in response to the prepare metadata message, each VSAN module records a snapshot entry in the corresponding archive section of the UPIT structure of the storage object being managed by that VSAN module. In an embodiment, the snapshot entry is similar to other snapshot entries recorded in the archive section of the respective UPIT structure. However, the snapshot entry would be indicated as being in a prepare stage, e.g., a snapshot pending status. In an embodiment, each new snapshot entry in the respective UPIT structure is identified as being in a prepare stage using, for example, a flag or a data field in the UPIT structure. In a particular implementation, a snapshot entry may have the following format—vsan:://(storage object UUID)::(snapshot UUID), where UUID stands for universal unique identifier. As an example, an archive section of a UPIT structure may include two snapshot entries, (1) vsan:://ABC::xyz1 and (2) vsan:://ABC::xyz2. In this example, the new snapshot entry would be "vsan:://ABC::xyz3," which indicates that the new snapshot is more recent in time than the "xyz2" snapshot. In some embodiments, after the new snapshot entry is recorded, the corresponding VSAN module may send a confirmation to the driving VSAN module to let the driving VSAN module know that the new snapshot entry has been recorded. In the example of FIG. 7, a new snapshot entry is added to the archive section in the UPIT structure U1 for the namespace object NS by the VSAN module 714A of the host computer H1. A similar new snapshot entry is added to the archive section in the UPIT structure US for the virtual disk object VD1 by the VSAN module 714B of the host computer H2. A similar new snapshot entry is added to the archive section in the UPIT structure U3 for the virtual disk object VD2 by the VSAN module 714C of the host computer H3.

In some embodiments, after the new snapshot entry is recorded, the corresponding VSAN module may send a confirmation to the driving VSAN module to let the driving VSAN module know that the new snapshot entry has been recorded. In these embodiments, the snapshot operation would not proceed further without confirmation from all the VSAN modules involved in the group snapshot.

Next, at an optional block 810, a lookup process is performed by the driving VSAN module to determine a distributed object manager (DOM) owner for each of the storage objects of the group. This optional block is performed if there are DOMs for the storage objects in the group, which may reside in the VSAN modules. In an embodiment, the driving VSAN module accesses a database that includes the needed information in the form of a list of DOM owners of the storage objects in the group. In the example of FIG. 7, a lookup may be performed by the VSAN module 714C of the host computer H3 to find out that the DOM owner of the UPIT structure U1 for the namespace object NS is the VSAN module 714A of the host computer H1, that the DOM owner of the UPIT structure U2 for the virtual disk object VD1 is the VSAN module 714B of the host computer H2 and that the DOM owner of the UPIT structure U3 for the virtual disk object VD2 is the VSAN module 714C of the host computer H3.

Next, at block 812, a prepare snapshot process is invoked by the driving VSAN module on the VSAN modules (or DOM owners) that are managing the storage objects of the group. In an embodiment, a remote procedure call (RPC) is made on the VSAN modules of the host computers managing the storage objects of the group to invoke the prepare snapshot process. The RPC may be made on the VSAN modules of the host computers in the order of the storage objects identified in the request. In the example of FIG. 7, a prepare snapshot process is invoked on the VSAN modules of the host computers H1, H2 and H3 in the following order: H3, H1 and H2, which reflects the order in which the storage objects were identified in the group snapshot request.

Next, at block 814, in response to the invocation of the prepare snapshot process, I/O operations on each storage object are blocked by the VSAN module managing the UPIT structure of that storage object as part of the prepare snapshot process. In the example of FIG. 7, I/O operations are blocked on the namespace object NS, the virtual disk object VD1 and the virtual disk object VD2 by the VSAN modules 714A, 714B and 714C of the host computers H3, H1 and H2, respectively.

Next, at block 816, in response to the invocation of the prepare snapshot process, a timer for a predefined period, such as 30 seconds, is started for each storage object by the VSAN module managing the UPIT structure of that storage object. In the example of FIG. 7, a timer is started for each of the namespace object NS, the virtual disk object VD1 and the virtual disk object VD2 by the VSAN modules 714A, 714B and 714C of the host computers H3, H1 and H2, respectively.

Next, at block 818, a determination is made whether all the prepare snapshot processes have been successful, e.g., confirmations have been returned to the driving VSAN module from each of the VSAN modules of the host computers H1, H2 and H3. Each confirmation from a VSAN module indicates that the I/O operations were blocked for the storage object being managed by that VSAN module. If it determined that all the prepare snapshot processes have not been successful, then the operation proceeds to block 820, where a prepare cancel process is invoked by the driving VSAN module to the VSAN modules of the host computers H1, H2 and H3. In the example of FIG. 7, if I/O operations were successfully blocked on the namespace object NS and the virtual disk object VD1 but not on the virtual disk object VD2, then a prepare cancel process would be invoked by the VSAN module 714C of the host computer H3 for all the VSAN modules 714A, 714B and 714C of the host computers H1, H2 and H3.

Next, at block 822, in response to the prepare cancel process invocation, the respective timer is canceled for each storage object by the VSAN module managing that storage object. In addition, at block 824, in response to the prepare cancel invocation, I/O operations on each storage object are unblocked by the VSAN module managing that storage object, if the I/O operations on that storage object was previously blocked. The operation then proceeds to block 844. In the example of FIG. 7, in response to a prepare cancel process invocation, the timers are canceled by the VSAN modules 714A, 714B and 714C of the host computers H1, H2 and H3. In addition, I/O operations on the namespace object NS and the virtual disk object VD1 are unblocked by the VSAN modules 714A and 714B of the host computers H1 and H2, respectively.

However, at block 818, if it is determined that all the prepare snapshot processes have been successful, then the operation proceeds to block 826, where a commit snapshot process is invoked by the driving VSAN module on the VSAN modules that are managing the storage objects of the group. In an embodiment, an RPC is made on the VSAN modules of the host computers managing the storage objects of the group to invoke the commit snapshot process. The RPC may be made on the VSAN modules of the host computers in the order of the storage objects identified in the request. In the example of FIG. 7, a commit snapshot process is invoked on the VSAN modules 714A, 714B and 714C of the host computers H1, H2 and H3 in the following order: H3, H1 and H2, which reflects the order in which the storage objects were identified in the group snapshot request.

Next, at block 828, in response to the invocation of the commit snapshot process, a determination is made at each VSAN module whether the respective timer is valid (i.e., not expired). If the timer has not expired, then at block 830, a snapshot of the managed storage object is created in the corresponding UPIT structure by the VSAN module managing that storage object in the same manner as described above with respect to FIGS. 2A-2C as part of the commit snapshot process. Next, at block 832, the I/O operations are unblocked by the VSAN module. Next, at block 834, an indication of snapshot success is returned to the driving VSAN module from the VSAN module managing the corresponding storage object. The operation then proceeds to block 838. However, if the timer has expired, then at block 836, an indication of snapshot failure is returned to the driving VSAN module. The operation then proceeds to block 838. In the example of FIG. 7, if timer has expired for one or more the namespace object NS and the virtual disk objects VD1 and VD2, then an indication of snapshot failure will be returned to the driving VSAN module 714C.

At block 838, a determination is made whether the indication of snapshot success is returned to the driving VSAN module from each of the VSAN modules of the host computers H1, H2 and H3. If it is determined that the indication of snapshot success is not returned from each of the VSAN modules, then the operation proceeds to block 840, where a delete snapshot process is invoked by the driving VSAN module to the VSAN modules of the host computers H1, H2 and H3. In the example of FIG. 7, if the commit snapshot process was successful on the namespace object NS and the virtual disk object VD1 but not on the virtual disk object VD2, then a delete snapshot would be involved by the VSAN module 714C of the host computer H3 for all the VSAN modules of the host computers H1, H2 and H3.

Next, at block 842, in response to the delete snapshot invocation, the newly created snapshot of each storage object in the respective UPIT structure is deleted by the VSAN module managing that storage object, if the new snapshot of that storage object was successfully created in the respective UPIT structure. Next, at block 844, a failure of the snapshot process is deemed true by the driving VSAN module. The operation then proceeds to block 848. In the example of FIG. 7, in response to the delete snapshot invocation, any snapshot of the namespace object NS and the virtual disk objects VD1 and VD2 that was created would be deleted from the corresponding UPIT structure by the VSAN module managing that snapshot.

However, if it is determined that the indication of snapshot success is returned from each of the VSAN modules, then the operation proceeds to block 846, where a success of snapshot process is deemed true by the driving VSAN module. The operation then proceeds to block 852. In the example of FIG. 7, if snapshots were successfully created for the namespace object NS and the virtual disk objects VD1 and VD2 in the UPIT structures U1, U2 and U3, respectively, then a success of snapshot process is deemed true by the driving VSAN module 714C.

At block 848, in response to a failure of the snapshot process, an undo metadata request is transmitted from the driving VSAN module to the VSAN modules of the host computers managing the different storage objects identified in the group snapshot request. The operation then proceeds to block 850, where the actions performed for the prepare metadata process are undone by the VSAN modules of the host computers managing the different storage objects identified in the group snapshot request. The operation then comes to an end. In the example of FIG. 7, in response to a failure of the snapshot process, the new snapshot entries recorded in the UPIT structures U1, U2 and U3 for the namespace object NS and the virtual disk objects VD1 and VD2, respectively, would be removed from the respective UPIT structures by the respective managing VSAN modules.

At block 852, in response to a success of the snapshot process, a commit metadata request is transmitted from the driving VSAN module to the VSAN modules of the host computers managing the different storage objects identified in the group snapshot request. The operation then proceeds to block 854, where the new snapshot entry is committed by each of the VSAN modules of the host computers managing the different storage objects identified in the group snapshot request. The operation then comes to an end. In the example of FIG. 7, in response to a success of the snapshot process, the new snapshot entries recorded in the UPIT structures U1, U2 and U3 for the namespace object NS and the virtual disk objects VD1 and VD2, respectively, would be committed in the respective UPIT structures by the respective managing VSAN modules. In an embodiment, each new snapshot entry in the respective UPIT structure is identified as being committed using, for example, a flag or a data field in the UPIT structure.

Figure 8A:
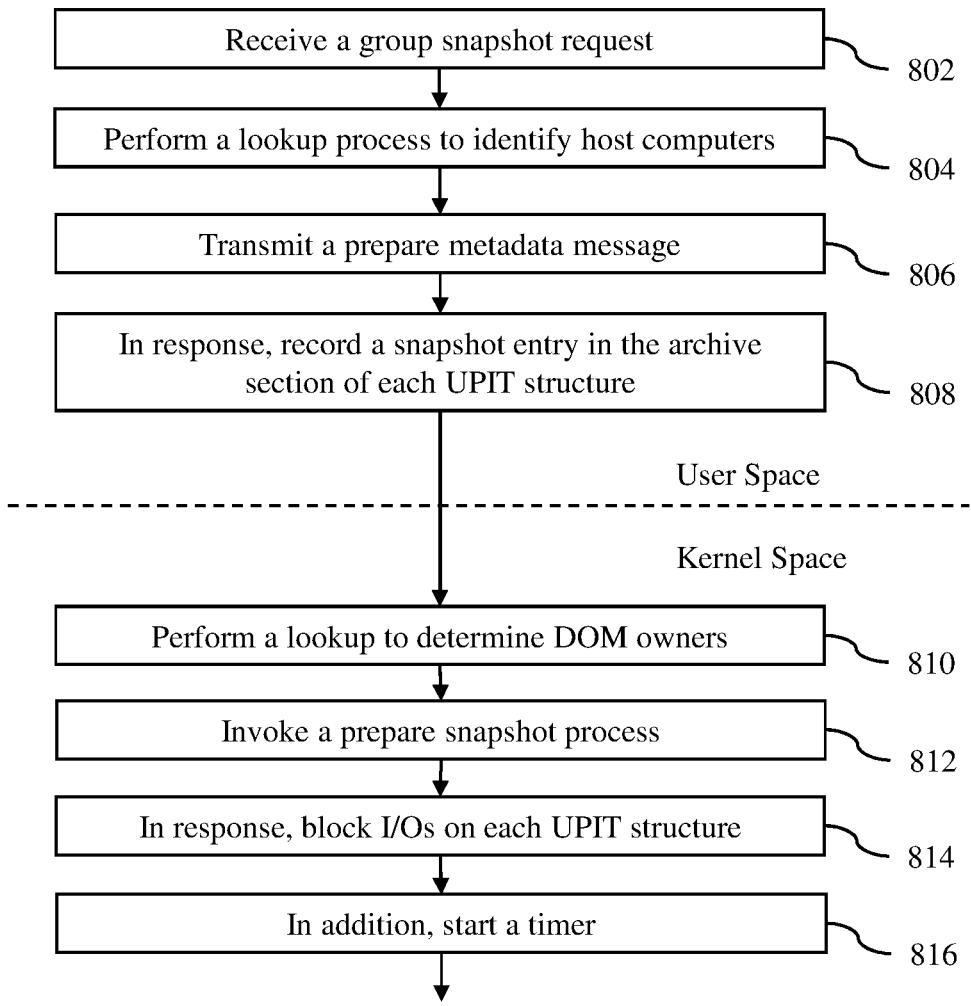
FIGS. 8A and 8B illustrate a flow diagram of the group snapshot operation executed by a VSAN file system that includes VSAN modules in different host computers of a distributed computer system in accordance with an embodiment of the invention.
Figure 8B:
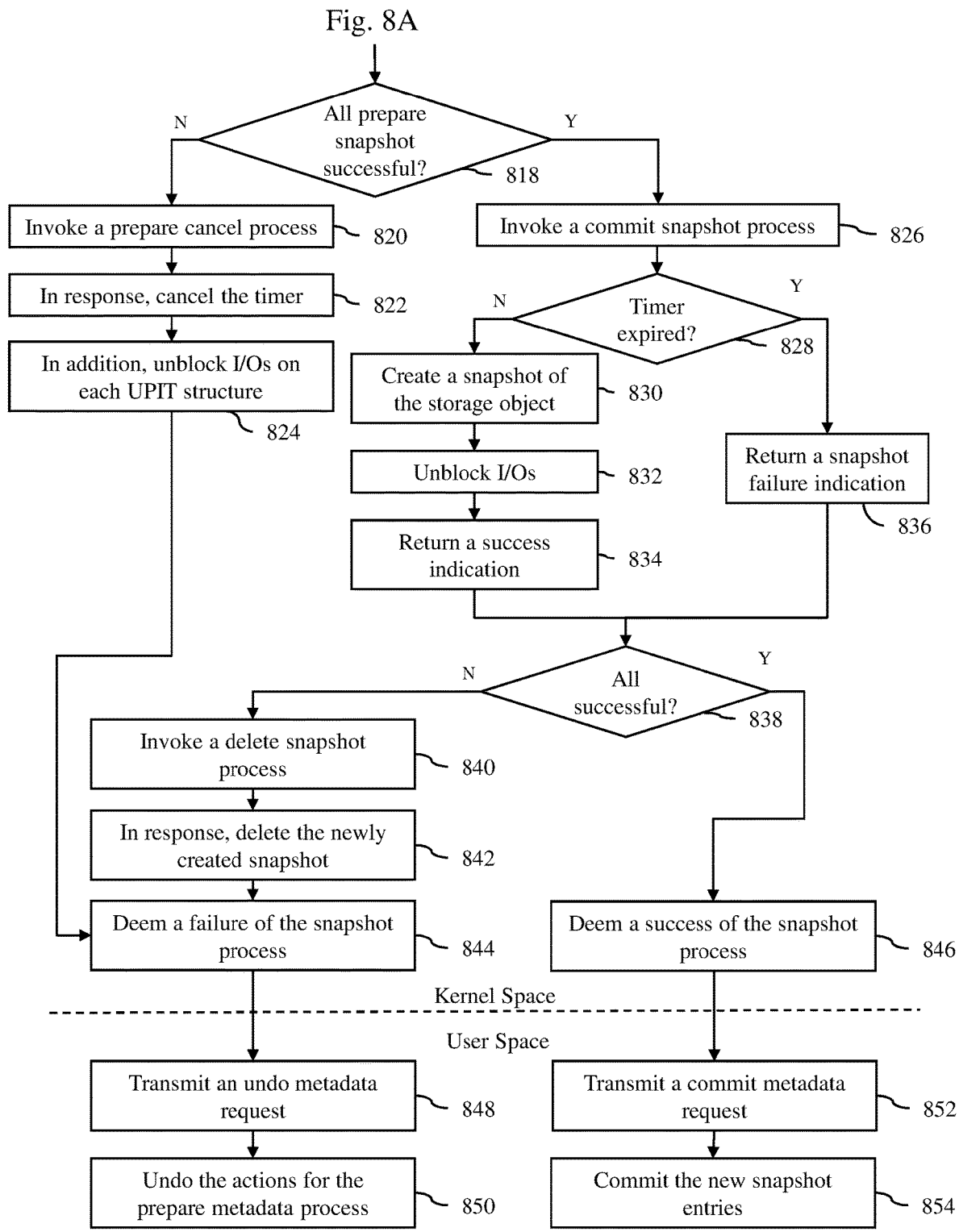

As illustrated in FIGS. 8A and 8B, blocks 802-808 and 846-852 of the group snapshot operation are performed in the user space, while blocks 810-844 of the group snapshot operation are performed in the kernel space. However, in other embodiments, some or all of these blocks may be performed in either the user space or the kernel space, or some other combination of the two.

In this manner, a group snapshot of multiple storage objects is created. The multiple storage objects may be storage objects that support a single application, such as a virtual machine, or multiple applications, such as a set of virtual machines. As described above, the group snapshot operation is an atomic operation so that either all the snapshots of the storage objects are created for the group snapshot or the system is reverted to prior state before the start of the group snapshot operation if any failure occurs during the group snapshot operation.

Figure 9:
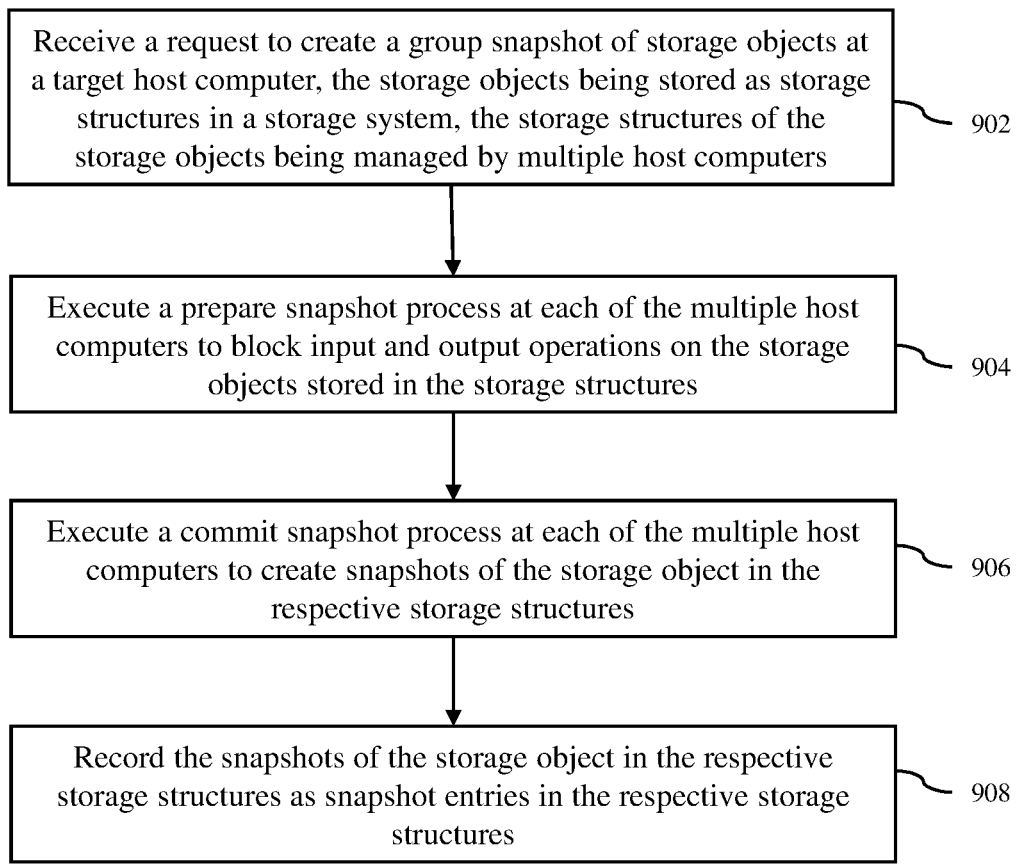
FIG. 9 is a flow diagram of a method for creating group snapshots of multiple storage objects in accordance with an embodiment of the invention.

A method for creating group snapshots of multiple storage objects in accordance with an embodiment of the invention is described with reference to a flow diagram of FIG. 9. At block 902, a request to create a group snapshot of storage objects is received at a target host computer. The storage objects are stored as storage structures, e.g., UPIT structures, in a storage system. The storage structures of the storage objects are managed by multiple host computers. At block 904, a prepare snapshot process is executed at each of the multiple host computers to block input and output operations on the storage objects stored in the storage structures. At block 906, a commit snapshot process is executed at each of the multiple host computers to create snapshots of the storage object in the respective storage structures. At block 908, the snapshots of the storage object are recorded in the respective storage structures as snapshot entries in the respective storage structures.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for creating group snapshots of multiple storage objects, the method comprising:
    receiving a request to create a group snapshot of different storage objects of a virtual computing instance at a target host computer of a cluster of host computers, wherein each host computer in the cluster includes a local storage device that is part of a storage array formed by local storage devices of the host computers in the cluster and wherein the virtual computing instance is running on one of the host computers in the cluster, the different storage objects being stored as storage structures in different local storage devices of multiple host computers in the cluster, wherein each of the storage structures includes metadata and data of snapshots and a native parent of a particular storage object of the different storage objects and wherein each of the storage structures stored in a particular local storage device of a particular host computer in the cluster is managed by that particular host computer;
    executing a prepare snapshot process at each of the multiple host computers in the cluster to block input and output operations on the different storage objects stored in the storage structures in the different local storage devices of the multiple host computers;
    executing a commit snapshot process at each of the multiple host computers in the cluster to create snapshots of the different storage objects in the respective storage structures in the different local storage devices of the multiple host computers; and
    recording the snapshots of the different storage objects in the respective storage structures as snapshot entries in the respective storage structures in the different local storage devices of the multiple host computers in the cluster.

2. The method of claim 1, wherein the commit snapshot process is executed only after the prepare snapshot process is successfully completed by each of the multiple host computers.

3. The method of claim 1, wherein recording the snapshots of the different storage objects in the respective storage structures as the snapshot entries in the respective storage structures further comprises committing the snapshot entries in the respective storage structures only after the commit snapshot process is successfully completed by each of the multiple host computers.

4. The method of claim 1, wherein each of the snapshots is created in the respective storage structure using a B+ tree structure.

5. The method of claim 1, wherein each of the snapshot entries is recorded in an archive section of the respective storage structure.

6. The method of claim 1, wherein the different storage objects stored as the storage structures include storage objects supporting a virtual machine, the storage objects supporting the virtual machine including a namespace object for the virtual machine and one or more virtual disk objects for the virtual machine that are stored as the storage structures in the different local storage devices of the multiple host computers.

7. The method of claim 1, wherein each of the storage structures includes at least an archive section, a metadata section and a data section, and wherein the snapshot entries are recorded in the archive section of the storage structures.

8. A non-transitory computer-readable storage medium containing program instructions for creating group snapshots of multiple storage objects, wherein execution of the program instructions by one or more processors of a computer system causes the one or more processors to perform steps comprising:
    receiving a request to create a group snapshot of different storage objects of a virtual computing instance at a target host computer of a cluster of host computers, wherein each host computer in the cluster includes a local storage device that is part of a storage array formed by local storage devices of the host computers in the cluster and wherein the virtual computing instance is running on one of the host computers in the cluster, the different storage objects being stored as storage structures in different local storage devices of multiple host computers in the cluster, wherein each of the storage structures includes metadata and data of snapshots and a native parent of a particular storage object of the different storage objects and wherein each of the storage structures stored in a particular local storage device of a particular host computer is managed by that particular host computer;
    executing a prepare snapshot process at each of the multiple host computers in the cluster to block input and output operations on the different storage objects stored in the storage structures in the different local storage devices of the multiple host computers;
    executing a commit snapshot process at each of the multiple host computers in the cluster to create snapshots of the different storage objects in the respective storage structures in the different local storage devices of the multiple host computers; and
    recording the snapshots of the different storage objects in the respective storage structures as snapshot entries in the respective storage structures in the different local storage devices of the multiple host computers in the cluster.

9. The computer-readable storage medium of claim 8, wherein the commit snapshot process is executed only after the prepare snapshot process is successfully completed by each of the multiple host computers.

10. The computer-readable storage medium of claim 8, wherein recording the snapshots of the different storage objects in the respective storage structures as the snapshot entries in the respective storage structures further comprises committing the snapshot entries in the respective storage structures only after the commit snapshot process is successfully completed by each of the multiple host computers.

11. The computer-readable storage medium of claim 8, wherein each of the snapshots is created in the respective storage structure using a B+ tree structure.

12. The computer-readable storage medium of claim 8, wherein each of the snapshot entries is recorded in an archive section of the respective storage structure.

13. The computer-readable storage medium of claim 8, wherein the different storage objects stored as the storage structures include storage objects supporting a virtual machine, the storage objects supporting the virtual machine including a namespace object for the virtual machine and one or more virtual disk objects for the virtual machine that are stored as the storage structures in the different local storage devices of the multiple host computers.

14. The computer-readable storage medium of claim 8, wherein each of the storage structures includes at least an archive section, a metadata section and a data section, and wherein the snapshot entries are recorded in the archive section of the storage structures.

15. A distributed computer system comprising:
a storage array; and
a cluster of host computers having access to the storage array, wherein each host computer in the cluster includes a local storage device that is part of the storage array formed by local storage devices of the host computers in the cluster and wherein a virtual computing instance is running on one of the host computers in the cluster,
wherein each of the host computer is configured:
to receive a request to create a group snapshot of different storage objects of the virtual computing instance, the different storage objects being stored as storage structures in different local storage devices of multiple host computers, wherein each of the storage structures includes metadata and data of snapshots and a native parent of a particular storage object of the different storage objects and wherein each of the storage structures stored in a particular local storage device of a particular host computer in the cluster is managed by that particular host computer;
execute a prepare snapshot process to block input and output operations on at least one of the different storage objects stored in the storage structures in the different local storage devices of the multiple host computers in the cluster;
execute a commit snapshot process to create a snapshot of at least one the different storage objects in the respective storage structures in the different local storage devices of the multiple host computers in the cluster; and
record the snapshot of at least one the different storage objects in the respective storage structures as a snapshot entry in the respective storage structure where the snapshot was created in the different local storage devices of the multiple host computers in the cluster.

16. The distributed computer system of claim 15, wherein each of the snapshots is created in the respective storage structure using a B+ tree structure.

17. The distributed computer system of claim 15, wherein each of the snapshot entries is recorded in an archive section of the respective storage structure.

18. The distributed computer system of claim 15, wherein the different storage objects stored as the storage structures include storage objects supporting a virtual machine, the storage objects supporting the virtual machine including a namespace object for the virtual machine and one or more virtual disk objects for the virtual machine that are stored as the storage structures in the different local storage devices of the multiple host computers.

19. The method of claim 1, further comprising performing a lookup service by the target host computer to identify all the host computers in the cluster managing the different storage objects of the virtual computing instance identified in the request before executing the prepare snapshot process.

20. The computer-readable storage medium of claim 8, wherein the steps further comprise performing a lookup service by the target host computer to identify all the host computers in the cluster managing the different storage objects of the virtual computing instance identified in the request before executing the prepare snapshot process.

* * * * *